INVENTOR:
STEPHEN K. ALTES,

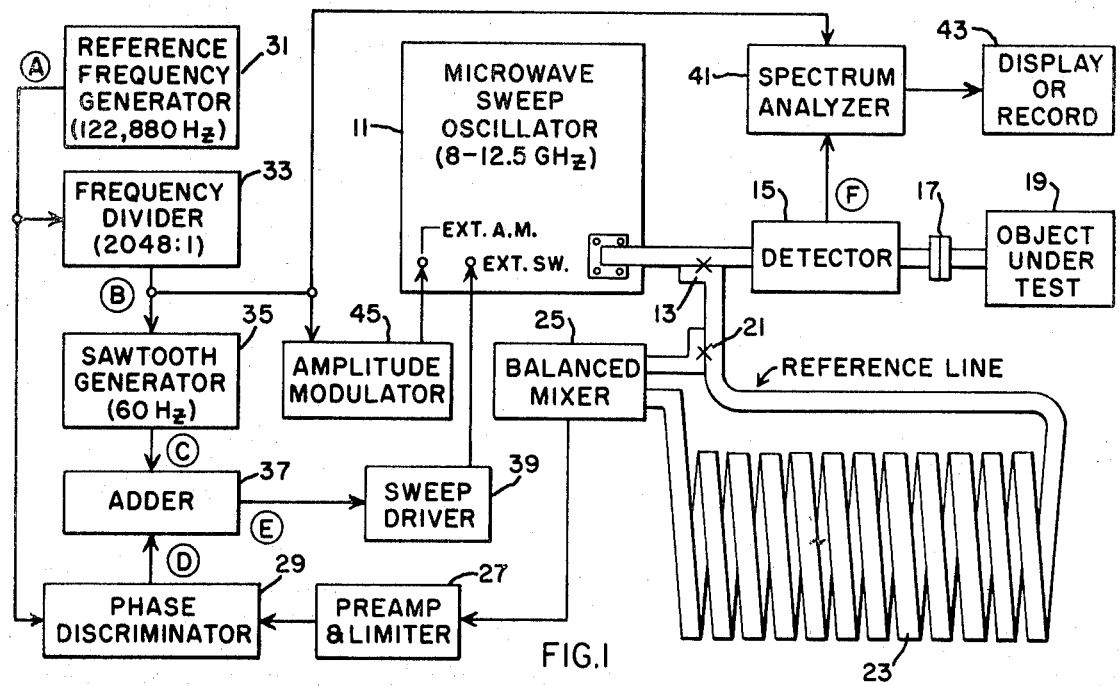
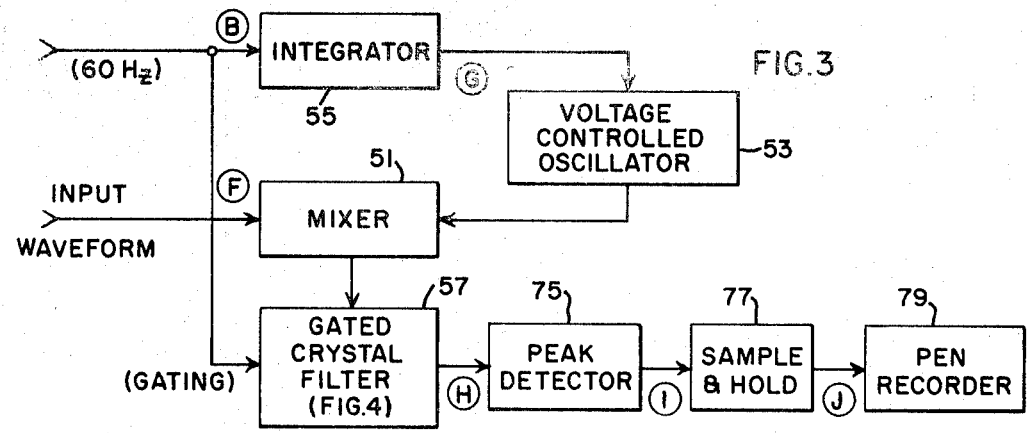
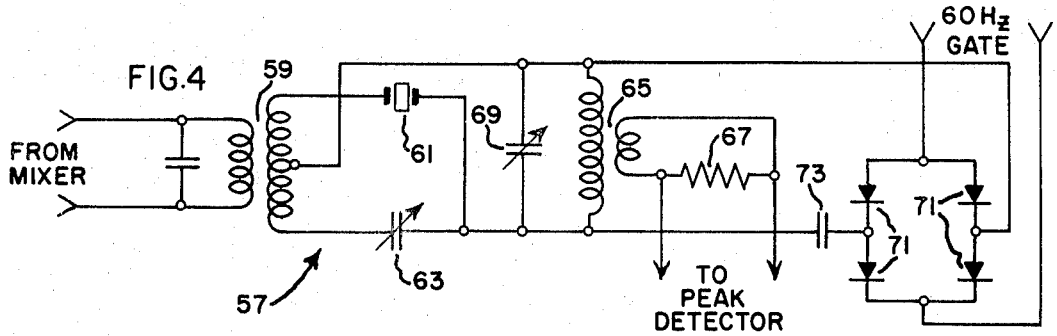

BY  C. W. Baker
HIS ATTORNEY.

United States Patent Office 3,535,628
Patented Oct. 20, 1970

3,535,628
MICROWAVE REFLECTOMETER INCLUDING SWEEP GENERATOR DRIVEN AT CONTROLLED NONLINEAR SWEEP RATE AND SPECTRUM ANALYZER SYNCHRONIZED THERETO
Stephen K. Altes, Fayetteville, N.Y., assignor to General Electric Company, a corporation of New York
Filed Apr. 10, 1968, Ser. No. 720,136
Int. Cl. G01r 27/04
U.S. Cl. 324—58        9 Claims

ABSTRACT OF THE DISCLOSURE

A microwave reflectometer is described capable of time domain reflectometric measurements of waveguide assemblies and other test objects of similarly dispersive character. A sweep generator coupled to the test object is driven at a controlled nonlinear sweep rate such that the beat frequencies generated by reflection within the test object remain constant with time, thus permitting their easier discrimination, identification and measurement. For controlling the sweep rate so as to maintain these beat frequencies constant, the sweep drive is enclosed within a servo loop in which the error signal is derived by comparison of a reference beat frequency signal generated across a reference transmission line of fixed length against a fixed frequency signal in a phase detector the output of which adjusts the sweep drive rate as necessary to maintain phase lock of the reference signal to the fixed frequency signal. Also described is spectrum analyzer circuitry providing optimized stability and clarity of resolution and display of the reflectometric beat frequency signals generated within the test object.

FIELD OF THE INVENTION

The invention herein described was made in the course of or under a contract, or subcontract thereunder, with the Department of the Army.

This invention relates generally to the field of microwave measurements and more specifically to time and distance domain reflectometric measurements of performance characteristics of microwave components such as waveguides and other transmission lines.

Time domain reflectometry has in recent years found ever increasing use in performance analysis of microwave components such as coaxial cable and other TEM devices in which signal propagation is nondispersive in character. Use of time domain reflectometry in such TEM mode devices provides a convenient and reliable technique for location of sources of reflections within the component, as for example irregularities or discontinuities in the dielectric medium. At least equal benefit would derive if similar reflectometric techniques and devices could be used with microwave components such as waveguides in which signal propagation is dispersive in character. However, signal dispersion within the test object precludes or at least seriously complicates the application of conventional reflectometric techniques, so these techniques generally do not lend themselves to use with waveguides except those of such short length that dispersive effects may be neglected.

The prior art includes a number of proposals for enabling time domain reflectometric measurements in waveguide and other dispersive components by refinement of the basic time domain reflectometry technique. For example, in a paper by D. L. Hollway entitled "The Comparison Reflectometer" and published in the "IEEE Transactions on Microwave Theory and Techniques," volume MTT-15, No. 4, April 1967, there is described a reflectometer in which a reference reflection is used to enable accurate measurement nothwithstanding the effects of dispersion in the test object. This is accomplished by combining the reflected wave with an accurately known reference wave, a measure of the total reflection coefficient being recorded at a number of preset frequencies covering a particular waveband. From sets of readings taken with and without the test component connected, a computer calculates and plots the distribution of reflections as a function of distance and prints out their magnitudes and phases.

The present invention is directed to reflectometers capable of measurements of this kind, and has as its principal objective the provision of such reflectometers characterized by the capability to produce measurement indications directly and in real time, yet affording relative simplicity of structure and economy of cost. This direct and real time output, together with the accuracy and ease of calibration also offered, yields good convenience of use and reliability of measurement. Reflectometers in accordance with the invention afford the additional advantages that they may be assembled using almost entirely standard items of test equipment, and that their versatility of application allows use with nondispersive lines as well as with waveguide and other transmission lines of dispersive character. A further feature of the invention is the provision of measurement signal output through a spectrum analyzer synchronized to the sweep rate of the sweep oscillator, in a manner to stabilize the output display and to clear it of the line spectrum which would otherwise be introduced by the sweep, thus enhancing the clarity and readability of the output.

SUMMARY OF THE INVENTION

The foregoing and other objects, features and advantages of the invention may be realized in a reflectometric system in which a microwave sweep oscillator of conventional type drives the waveguide or other object which is to be tested for internal reflection sources, and any reflected waves then beat with the input wave at frequencies which bear relationship to the distance between the points of input and reflection. To hold these beat frequencies constant notwithstanding the dispersive character of signal propagation within the test object, the generator is not swept at linear rate as in conventional reflectometers, but instead is swept at a controlled nonlinear rate, more slowly at the low end of the sweep frequency band than at the high end, in a manner such that the beat frequencies representing test object reflections remain at constant frequency.

For controlling sweep rate so as to achieve this, the sweep drive is enclosed within a servo loop in which any error in the sweep drive rate, i.e., any deviation of sweep frequency from the rate of change necessary for constancy of beat frequency output, is sensed by comparison of a reference beat frequency signal against a fixed frequency signal in a phase detector. The reference beat frequency signal is generated by coupling a portion of the sweeper output into a length of waveguide or other reference object which has dispersion characteristics similar to that of the test object, then beating this signal, either as transmitted through or as reflected by the reference object, against the input. The reference beat frequency signal thus generated is compared against a fixed frequency signal in a phase detector, and the resulting difference signal is used as an error signal input to control the sweep drive for the sweep oscillator. Separate means preferably are provided for generating at least a rough approximation of the sweep drive signal so that the error signal generated in the manner just described need accomplish corrective action only, which simplifies stabilizatiton of the servo loop constituted by the elements just described.

With sweep rate thus controlled, the beat frequencies which indicate reflections within the test object will remain constant as the input is recurrently swept. The output beat frequency spectrum accordingly may be sensed by a detector located near the point of input to the test object, and the detected signal displayed by a spectrum analyzer to provide a representation of the reflections and a measure of their distance within the test object from its input. For maximizing the frequency resolution of such display without compromise of stability and clarity, the spectrum analyzer preferably includes a narrow band crystal filter which is quenched at the end of each sweep. This permits relatively fast scanning by the spectrum analyzer while still preserving good frequency resolution.

BRIEF DESCRIPTION OF THE DRAWINGS

The invention will be further understood and its various objects, features and advantages more fully appreciated by reference to the appended claims and the following detailed description when read in conjunction with the accompanying drawings, wherein:

FIG. 1 is a block diagram of a microwave reflectometer in accordance with the invention;

FIG. 3 is block diagram of a spectrum analyzer suitable for use with the reflectometer of FIG. 1;

FIG. 4 is a circuit diagram of the gated crystal filter element in the spectrum analyzer of FIG. 3.

DESCRIPTION OF THE PREFERRED EMBODIMENT

Figure 2:
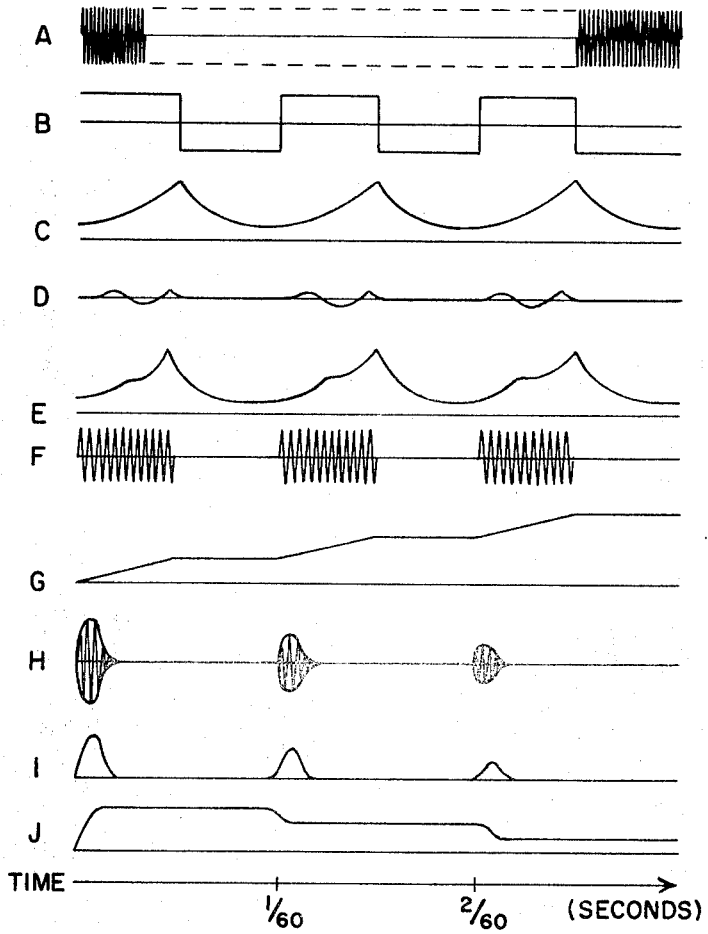
FIG. 2 illustrates waveforms representative of those appearing in operation of the reflectometer of FIG. 1 and also in the spectrum analyzer of FIG. 3.

With continuing reference to the drawings, the microwave reflectometer of the invention as illustrated in FIG. 1 utilizes a microwave sweep oscillator 11 which may be any of the several commercially available units affording external control of the sweep drive. The frequency response characteristics of the sweep drive input to oscillator 11 should be appropriate to the transfer characteristic of the servo loop hereinafter described, though generally either the sweep drive or the servo circuitry may by relatively simple circuit revision be altered as necessary to achieve compatibility between them. Also, it is desirable though not essential that the sweep generator include an external amplitude modulation input, for a purpose which will later be explained.

The signal output sweep oscillator 11 is split in a power divider 13 with part being transmitted on through a bidirectional detector 15 and through separable waveguide coupler 17 to the test object 19, which may be a waveguide assembly or other microwave transmission line. The part of the sweeper output which is coupled through divider 13 is again split in a second divider 21 and transmitted into a reference line 23, which conveniently may comprise a length of transmission line bent into the form of a helix or coil so as to minimize its space requirement. This reference line is of fixed length selected as hereinafter explained, and must have a frequncy dispersion characteristic similar to that of the test object 19. Since the reflectometers of this invention find most frequent use in applications involving waveguide measurement and matching, the necessary identity of dispersion characteristic may normally be easily accomplished simply by fabricating the reference line from a length of the same waveguide as in the assembly under test.

The input wave as coupled through divider 21 is mixed with the wave as transmitted with delay through the reference line 23, in a balanced mixer 25. The output of mixer 25 is a beat signal of frequency dependent upon (1) the frequency of the sweep oscillator output at any given moment, (2) the rate of change of this frequency, which is a function of the oscillator sweep repetition rate, (3) the effective length of the reference line 23, and (4) the dielectric constant of the fluid within the line, which for purposes of this description will be assumed to be air. For reasons which will later become apparent, significant simplification of system circuitry will result if these parameters are so related as to yield a beat signal frequency which is an integral multiple of the oscillator sweep repetition rate.

It might be mentioned at this point that for purposes of illustration representative values of operating frequencies have been included in several of the blocks representing system components in FIG. 1. The sweep oscillator, for example, is shown as covering the frequency range of approximately 8 to 12.5 gHz., which is X-band. The reflectometer of FIG. 1 may of course be used at other frequency bands, with appropriate changes in the frequencies indicated for the sweep oscilaltor and other components.

In the exemplary embodiment of the invention being described, and as illustrated in FIG. 1, the oscillator sweep repetition rate ($f_s$) has been chosen at 60 Hz. and the length of reference line 23 then is calculated to yield a beat frequency output from mixer 25 at a binary multiple of this 60 Hz. repetition rate, which in this example is 122,880 Hz. Using these values for the oscillator sweep repetition rate $f_s$ and the reference beat frequency ($f_{br}$) respectively, it will be shown hereinafter that the reference line should be approximately 160 feet in length.

The design value of the beat frequency $f_{br}$ generated across reference line 23, which as just indicated is 122,800 Hz. in this exemplary embodiment of the invention, is the frequency which must be held constant in order that the beat frequencies generated by reflections within the test object 19 and sensed by the bidirectional detector 15 remain also at constant frequency. To this end, the beat frequency signal from mixer 25, after preamplification and limiting at 27, is provided as one input to a phase discriminator 29 in which this signal is compared against a fixed reference signal of the 122,880 Hz. frequency, supplied to the phase discriminator from a crystal controlled or otherwise stabilized oscillator 31. The 122,880 Hz. fixed frequency signal from oscillator 31 also is transmitted through a 2048:1 frequency divided 33 to produce a 60 Hz. input to a sawtooth generator 35 to the output waveform of which preferably is hyperbolic in character for reasons to be explained. This 60 Hz. sawtooth combines in an added 37 with any phase error output of the phase discriminator 29, and the two inputs to adder 37 thus combined control the sweep driver 39 and its output to the external sweep (EXT. SW.) input of the sweep oscillator 11.

Before considering the mathematical basis for reflectometric measurements employing the arrangement just described, reference may be made to waveforms A–F in FIG. 2, which occur at the points in the circuit in FIG. 1 bearing the corresponding letters. Thus, waveform A as produced by the reference frequency generator is a 122,880 Hz. signal of fixed frequency nominally of the same value as the $f_{br}$ beat frequency which is derived by mixer 25 as the difference frequency across reference line 23. Frequency divider 33 produces the square wave 60 Hz. signal shown as waveform B in FIG. 2, and this square wave input to sawtooth generator 35 causes it to generate a signal of like frequency and of the generally hyperbolic form shown as waveform C. Any phase error between the two signal inputs to phase discriminator 29 will give rise to a correction signal which times may assume the general form shown as waveform D, and which when combined with waveform C in adder 37 will yield a composite waveform such as shown at E. This waveform is of the same basic 60 Hz. hyperbolic sweep, but compensated as necessary to hold the beat frequency output from mixer 25 precisely to the 122,880 Hz. reference value.

By thus controlling the sweep rate of oscillator 11, it may be assured that the beat frequencies generated by reflections at different distances within the test object 19 all will hold constant, thus permitting their detection and measurement. The output of detector 15 to the spectrum analyzer 41 and display or record device 43 then will be as shown by waveform F, which represents reflections from a single point within the test object. Where more than one reflection occurs waveform F will be correspondingly more complex but still will be amenable to spectrum analysis because the beat frequencies which are combined together to yield this more complex waveform will be each constant and therefore distinguishable. The distance from detector 15 to the point within the test object 19 from which emanates each reflection noted is measurable by the frequency of the beat signal generated by the wave reflected from that point, as will now be shown.

Letting:

$d$ = distance from detector 15 to a reflection in test object 19
$\lambda_g$ = wavelength in guide $$(\lambda_g = c/\sqrt{f^2 - f_c^2})$$

where
$c$ = velocity of light = $9.35 \times 10^8$ feet/sec.
$f$ = frequency of input wave
$f_c$ = guide cutoff frequency
$n$ = number of standing waves in distance $2d$ ($n = 2d/\lambda_g$)
$f_b$ = beat frequency at detector 15.

The beat frequency $f_b$ sensed at detector 15 is given by the expression:

$$f_b = \frac{dn}{dt} = \frac{d}{dt}\left(\frac{2d}{c}\sqrt{f^2 - f_c^2}\right) = \frac{2d}{c}\cdot\frac{d}{dt}\left(\sqrt{f^2 - f_c^2}\right) \quad (1)$$

The reference beat frequency ($f_{br}$) generated across reference line 23 may be similarly expressed, except that here there is no reflection so the length of the transmission path ($d_r$) is not doubled as in the case of the distance ($d$) above:

$$f_{br} = \frac{d_r}{c}\cdot\frac{d}{dt}\left(\sqrt{f^2 - f_c^2}\right) \text{ or } \frac{d}{dt}\left(\sqrt{f^2 - f_c^2}\right) = \frac{cf_{br}}{d_r} \quad (2)$$

Substituting this value for the derivative into Equation 1:

$$f_b = \frac{2d}{d_r}f_{br} \text{ or } d = f_b \cdot \frac{d_r}{2f_{br}} \quad (3)$$

Thus, since $d_r$ and $f_{br}$ both are fixed, it becomes possible by measuring $f_b$ for each reflection to determine its distance $d$ from the detector 15. In the specific embodiment being described, in which $f_{br}$ was chosen at 122,880 Hz. and $d_r$ at 160 feet, a reflection located at a point 10 feet from detector 15 would produce an output at 15,360 Hz.; a reflection at 40 feet would produce an output at 61,440 Hz., and so on.

As previously mentioned it is much easier to stabilize the sweep drive servo loop if the design variables involved are chosen such that the open loop drive signal provided by sawtooth generator 35 is a close approximation to the drive signal frequency and waveform required to hold $f_{br}$ constant, because the closer this open loop approximation is the smaller is the closed loop gain requirement. To better illustrate the nature of this design criterion and of the constraints its suggests for the parameters $f_{br}$, $d_r$ and $f_s$, it is helpful to further consider Equation 2, rearranged to the form:

$$f_{br} = \frac{d_r}{c} \cdot \frac{f}{\sqrt{f^2 - f_c^2}} \cdot \frac{df}{dt} \quad (4)$$

To satisfy the criterion set forth above it is necessary that the time required for the sweeper to sweep its entire frequency band, the limits of which were 7.9 gHz. and 12.55 gHz. in the case of the sweeper used in the particular embodiment being described, be equal to one-half the period of the sawtooth generator output, which requires that the total sweep time be equal to $\frac{1}{2}f_s$. It follows that the integral of Equation 4 between the limits $f_1 = 7.9$ gHz. and $f_2 = 12.55$ gHz. can be set equal to this time value, to yield:

$$\frac{1}{2f_s} = \frac{d_r}{cf_{br}}\int_{f_1}^{f_2}\frac{f}{\sqrt{f^2 - f_c^2}}\,df = \frac{d_r}{cf_{br}}\sqrt{f^2 - f_c^2}\bigg|_{f_1}^{f_2} \quad (5)$$

For standard X-band waveguide, for which $f_c^2$ is approximately $43 \cdot 10^{18}$, this reduces to:

$$f_s = f_{br}/12.6d_r \quad (6)$$

Any two of the three open design parameters included in this equation may be relatively arbitrarily chosen, and the third then is adjusted in value to satisfy the relation given.

This determines the frequency $f_s$ of the basic sweep drive signal which is produced by the sawtooth generator 35 and combined with the output of phase discriminator 29 in the adder 37. Considering next the desired waveform for this sweep drive, the task of the servo loop can be simplified and its stability enhanced by designing the generator 35 to produce a waveform at least approximating that necessary to hold the beat frequency output of mixer 25 constant without error signal from discriminator 29.

The basic waveform of sawtooth generator 35 necessary to satisfy this requirement can be seen to be of hyperbolic character from Equation 5, which defines the sweep frequency versus sweep time ($T_s$) relationship:

$$T_s = \frac{1}{2f_s} = \frac{d_r}{cf_{br}}\sqrt{f^2 - f_c^2} \quad (7)$$

A plot of this time-frequency relationship would of course be hyperbolic in form, showing this to be the preferred waveform for the sawtooth signal output of generator 35. In practice it has been found that the output waveform of conventional relaxation oscillators, including even those which produce an output nominally of exponential form, may be brought to an acceptably close approximation to the desired hyperbolic form by careful selection of circuit operating parameters and with little if any further wave shaping.

To minimize extraneous signal content both in the output signal from detector 15 and also in the error signal for the sweep oscillator drive, advantage may be taken of the external amplitude modulation input commonly included in commercial sweep oscillators, to blank the oscillator during retrace of the sawtooth generator output waveform. To this end, an amplitude modulator 45 is provided connected as shown to be driven by the 60 Hz. square wave output from frequency divider 33 and to provide a blanking signal input to the external amplitude modulation (EXT. AM.) terminal of the sweep oscillator 11.

It will be noted that with a sweep drive control loop as just described there exists a possibility of mode jumping, since lock is reestablished on each sweep. On successive sweeps the lock may happen to establish itself in a way such that the sweep is delayed or advanced by one full cycle of the 122,880 Hz. reference frequency, particularly if noise and microphonics are not well controlled. Any such possible tendency toward mode jumping may readily be suppressed, as for example by driving the sweep oscillator both up and down continuously and without interruption of the lock. Stability of the lock may be further enhanced if desired by use of two mixers driven in phase quadrature across the reference line, or alternatively a separate narrow band discriminator could be used to provide positive identification of the desired mode.

The adverse effects of mode jumping are second order and easily tolerable in most applications, however, and so will usually not require any such preventive measures.

Further, its effects can be competely eliminated by use of a spectrum analyzer of the preferred type described hereinafter, which does not integrate between successive sweep repetitions. This preferred spectrum analyzer is not essential to operativeness of the reflectometer of FIG. 1 and if desired there could instead be used a spectrum analyzer of any conventional type capable of waveform analysis at a rate at least equal to the output rate from detector 15, the output of which repeats with a periodicity of 60 Hz. in the embodiment being described. The spectrum analyzer preferably is structured in accordance with the invention as illustrated in FIGS. 3 and 4, however, which in addition to avoiding the adverse effects of mode jumping also affords another important advantage in that it suppresses the 60 Hz. spectral lines which otherwise might appear in the analyzer output display or record.

These spectral lines, which correspond to the 60 Hz. repetition rate of the sweep oscillator, would appear in the output of a conventional spectrum analyzer if the analyzer bandwidth is narrow and the rate of frequency change is reduced to match this narrow bandwidth. However, the 60 Hz. line spectral if permitted to appear in the output may detract from its readability, and while the lines can be eliminated by broadening the bandwidth of the spectrum analyzer or integrating over shorter periods, this may in some cases undesirably impair available resolution.

In accordance with the invention, the 60 Hz. spectral lines may be eliminated while still permitting maximum frequency resolution, by structuring the spectrum analyzer as shown in FIGS. 3 and 4. The spectrum analyzer there shown incorporates the usual mixer 51 to which the input waveform to be analyzed is supplied, and a local oscillator 53 supplying to the mixer a heterodyning signal of frequency varying over a frequency band at least equal to the bandwidth of the input waveform. The low end of the local oscillator frequency band preferably is set sufficiently high that the IF signal output from the mixer 51 is of higher frequency than the highest frequency component of the input waveform.

In conventional spectrum analyzers the local oscillator normally is continuously swept across the appropriate frequency range for scanning the input spectrum, and the mixer output is processed through a bandpass IF filter of as narrow bandwidth as possible consistent with compatibility of its impulse response to the sweep rate of the local oscillator. In the spectrum analyzer of this invention the local oscillator preferably is not continuously swept in frequency but instead is driven to produce a series of discrete frequencies stairstepped in synchronism with the 60 Hz. repetition rate of the analyzer signal input, and the IF filtering is accomplished by a gated crystal filter also keyed to the 60 Hz. repetition rate and switched in synchronism therewith between a first operating mode in which it intergates and stores the energy content of the analyzer signal input and a second operating mode in which it is quenched to release the stored energy and thus produce an output indication.

Stairstepping of frequency of the local oscillator 53 is not essential to operation of the system. It adds but little complexity, however, and permits integration at constant frequency thus reducing the bandwidth of the filter output and permitting some improvement in resolution. As shown, local oscillator 53 receives its frequency control voltage from an integrator 55 which derives this voltage from the 60 Hz. square wave signal (waveform B) taken from the frequency divider 33 in FIG. 1. Integrator 55 produces an output waveform as shown at G in FIG. 2, which as there shown is of the desired stairstep form and controls the output frequency of oscillator 53 in accordance with its stepped amplitude, with frequency being held constant during each integration cycle of the crystal filter to be described.

The IF signal from mixer 51 is transmitted through the gated crystal filter 57 which is illustrated in greater detail in FIG. 4. This filter is a two-mode device which operates during the integration portion of each cycle to establish a very narrow passband filter characteristic and to integrate those components of the incoming signal which fall within this narrow passband. During the quenching cycle which follows, quenching of the crystal releases the energy integrated and stored in it during the integration cycle, to produce a short duration, high frequency oscillatory pulse the amplitude of which provides a measure of the stored energy and thus an indication that the incoming signal included a frequency component at that point in the frequency spectrum.

Such two-mode spectral analyzer operation is particularly adapted to a system such as this in which the incoming signal is pulsed, since timing of the integration and quenching cycles then can be synchronized to the pulse repetition rate. This desired synchronization of filter operation with the sweep oscillator drive may conveniently be accomplished by transmitting the sweep drive signal (waveform B) as a gating signal into the filter 57 in the manner illustrated in FIGS. 3 and 4 and now to be described.

In FIG. 4, the filter 57 comprises an input transformer 59 across the primary of which is impressed the IF signal output of mixer 51. The center tapped secondary of this transformer 59 constitutes a low impedance source for driving a crystal 61 connected in series relation with a capacitor 63 adjustabe to tune for series resonance with the crystal during the integration cycle. For quenching the crystal quickly after the integration cycle, its shunt capacitance then is resonated with a shunt tank comprising an inductor 65, a damping resistor 67 being introduced in the shunt tank circuit for fast damping of the RF pulse resulting from this quenching. The series resonant circuit including the crystal and capacitor, together with the shunt resonant tank including the inductor, form, a bandpass L section which should be terminated then in the proper shunt resistance, which if of the correct value will hold the transient to a single RF pulse of minimum time duration and prevent objectionable overshoot or ringing.

In the embodiment illustrated the shunt inductor 65 includes a secondary winding providing the necessary impedance transformation to satisfy output signal requirements, and the damping resistor 67 is connected across this secondary winding as shown. The inductor primary is in parallel with the shunt trimmer capacitor 69 for tuning the shunt tank to resonance with the crystal, the trimmer capacitor being aligned by tuning for a minimum duration of the output RF pulse. The shunt tank is as shown connected across the center and one end tap of the input transformer secondary, and is switched into and out of circuit by an electronic switch consisting of four diodes 71 which are poled as shown and switched by the 60 Hz. square wave gating signal input at the point indicated. When the diodes 71 are driven in the forward direction the switch is closed, the shunt tank effectively is shorted by the switch, and the input if any is integrated and stored in the crystal resonant circuit; when the diodes are driven in the reverse direction the switch is opened and the shunt tank then operates to quench the crystal resonance.

In the closed condition the resistance of the diode switch is equal to the forward resistance slope at the operating point, which typically is of the order of 100 ohms. Since crystals of the frequencies appropriate here, which typically are of the order of 150 kHz., normally have an internal series equivalent resistance substantially larger than 100 ohms, the effect of the diode switch resistance on the crystal Q does not significantly affect its operation. To provide DC isolation for the switch a capacitor 73 may be connected in series relation with it as shown.

In operation of the gated crystal filter of FIG. 4, the filter switches between its integrating and quenching cycles depending upon whether the 60-Hz. gate signal input to the diode switch 71 is up or down. During the integration cycle the incoming signal components after conversion to IF in mixer 51 are effectively integrated with storage of energy in the crystal. At the end of this integration cycle the energy in the filter is quenched by being placed by the diode switch in series with the shunt resonant tank including the inductor 65. This quenching results in the generation of a high frequency oscillatory pulse which, if the damping introduced by resistor 67 is properly adjusted, will be critically damped to yield an output pulse having a pulse envelope as exemplified by waveform H in FIG. 2.

Referring again to FIG. 3, this high frequency pulse is peak detected as at 75 and the detected envelope fed to a sample and hold circuit 77. This circuit, the input to which is as shown at waveform I in FIG. 2, is driven by a pulse coincident with the crystal transient and derived therefrom, to produce an output signal like waveform J, which represents a sample taken of waveform I near the peak of the crystal transient and held until the next following such transient.

Figure 5:
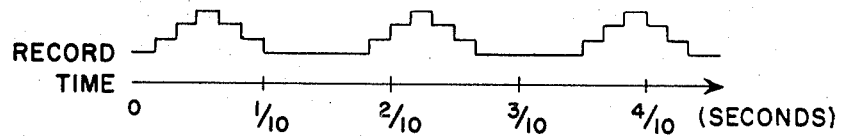
FIG. 5 illustrates the form of the recorder signal output from the spectrum analyzer of FIG. 3.

The output signal recorder 79 preferably is of a type having relatively short time constant, such as moving pen recorder as illustrated or a storage oscilloscope. With a recorder having a time constant of 10 milliseconds, for example, it is possible to scan through 2000 Hz. per second, and the total time required to scan through the 122,880 kHz. band required then is approximately 60 seconds. The output recording, which is of the form illustrated in FIG. 5, constitutes a reflection versus distance plot from which locations of reflections within the test object may be determined quickly and with good accuracy in the manner hereinabove explained.

While in this description of the invention only a presently preferred embodiment has ebeen illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. A time domain reflectometer for reflectometric testing of microwave components, comprising:
   (a) a microwave sweep oscillator including frequency control means responsive to an input sweep drive signal to control the oscillator output frequency and the rate of sweep thereof;
   (b) a reference line of predetermined length and having dispersion characteristics similar to the microwave component under test;
   (c) means coupling the output of said sweep oscillator both to said reference line and to the component under test;
   (d) means for deriving a first beat frequency signal by mixing said sweep oscillator signal as applied to said reference line with the sweep oscillator signal as transmitted through said line at least once;
   (e) reference signal generator means puroviding a reference frequency signal;
   (f) discriminator means having applied thereto said first beat frequency signal and said reference frequency signal and including means for comparing these applied signals to derive a sweep rate error signal;
   (g) sweep drive means responsive to said error signal to control the rate sweep drive of said sweep oscillator so as to maintain said first beat frequency equal to said reference frequency;
   (h) means for deriving a second beat frequency signal by mixing said sweep oscillator signal as applied to the component under test with the sweep oscillator signal as reflected from a point of reflection within said component; and
   (i) means for determining the frequency of said second beat frequency to thereby indicate the location of said point of reflection within the component under test.

2. A reflectometer as defined in claim 1 wherein the oscillator sweep drive comprises:
   (a) a sawtooth signal generator;
   (b) means coupling said sawtooth generator to said reference signal generator so as to hold the output sawtooth signal at a frequency which is in integral harmonic of that supplied to said discriminator means; and
   (c) adder means having as inputs thereto said sawtooth signal and said sweep rate error signal as derived by said discriminator means, said adder means combining these inputs to produce the sweep drive signal to which said sweep drive means is responsive.

3. A reflectometer as defined in claim 1 wherein said means for determining the frequency of said second beat frequency signal comprises a spectrum analyzer including gated crystal filter means switchable between a first operating mode in which it integrates and stores the energy content of the analyzer signal input and a second operating mode in which it is quenched to release the stored energy and thus produce an output indication, and means for switching said filter means between its two said operating modes in synchronism with the sweep repetition rate of said microwave sweep oscillator.

4. In combination an apparatus for time domain reflectometric measurements in waveguide structures,
   (a) a microwave sweep oscillator providing an output signal of frequency which sweeps through a predetermined frequency range under control of an input sweep drive signal;
   (b) sweep drive means for supplying said input sweep drive signal to said sweep oscillator;
   (c) a reference frequency source operative to provide first and second constant frequency signals with the frequency of the second of said signals being an integral multiple of the first;
   (d) a sawtooth signal generator operative under control of said first reference frequency signal to produce an output of that frequency and of sawtooth waveform;
   (e) means including a signal adder having as one input thereto the signal output of said sawtooth generator and as another such input a sweep rate error signal, and operable to transmit the signal derived by addition of these inputs to said sweep drive means for control thereof;
   (f) means for deriving said sweep rate error signal including a reference waveguide of predetermined length, means coupling the output of said sweep oscillator into said reference waveguide and into the waveguide structure under test, means for deriving a first beat frequency signal by mixing said sweep oscillator signal as applied to said reference waveguide with the signal after transmission through said line, and discriminator means for comparing said first beat frequency signal against said second reference frequency signal to produce the sweep rate error signal;
   (g) means for deriving a second beat frequency signal by mixing said sweep oscillator signal as applied to the waveguide structure under test with that signal as reflected from a point of reflection therein; and
   (h) means for determining the frequency of said second beat frequency to thereby indicate the location of said point of reflection.

5. Reflectometric apparatus as defined in claim 4 wherein said sawtooth generator produces an output waveform of generally hyperbolic character.

6. Reflectometric apparatus as defined in claim 4 further including amplitude modulation means for blanking said microwave sweep oscillator during retrace of said sawtooth generator.

7. A spectrum analyzer for frequency analysis of an input signal of pulsed character, comprising:
(a) a frequency controllable local oscillator and means for controlling its frequency to produce an output signal varying through a frequency band of width corresponding to the bandwidth of the frequency spectrum to be analyzed;
(b) mixer means for heterodyning said local oscillator output signal with the input signal;
(c) filter means including a crystal, means coupling the output of said mixer to drive said crystal, first reactance means connected in series relation with said crystal and resonant therewith when driven by said mixer, second reactance means resonant with said crystal when connected in shunt relation therewith, and electronic switch means connected to switch said second reactance means into and out of shunt circuit relation with said crystal, said filter means being operative when said second reactance means is switched out to integrate the signal input from said mixer by driving said crystal to resonance at the signal frequency with said first reactance means, and operative when said second reactance means is switched in to quench the resonance at this signal frequency and produce an output pulse by resonance at higher frequency; and
(d) means for detecting said output pulse and providing a measure of signal energy at the corresponding frequency of the input signal spectrum by indication of the pulse amplitude.

8. A spectrum analyzer as defined in claim 7 wherein said switching means comprises an electronic switch operative under control of said pulsed input signal to cycle at a frequency corresponding to the pulse repetition rate thereof.

9. A spectrum analyzer as defined in claim 7 wherein said local oscillator comprises a voltage controlled oscillator and an integrator operative in response to the pulse repetition rate of said pulsed signal input to apply to said voltage controlled oscillator a stepped control voltage such that the oscillator output is correspondingly stepped in frequency and remains at substantially constant frequency during each integration cycle of said crystal filter.

References Cited

UNITED STATES PATENTS 3,350,633  10/1967  Hyde _____ 324—.5

OTHER REFERENCES

Holton, W. C., and Blum, H.: Parametric Resonance of F Centers in Alkali Halides in Physical Review, vol. 125, No. 1, Jan. 1, 1962, pp. 89–103.

EDWARD E. KUBASIEWICZ, Primary Examiner